(No Model.) 2 Sheets—Sheet 1.
E. S. HOTCHKISS.
METHOD OF INSERTING SPRINGS IN TRAPS.
No. 449,534. Patented Mar. 31, 1891.
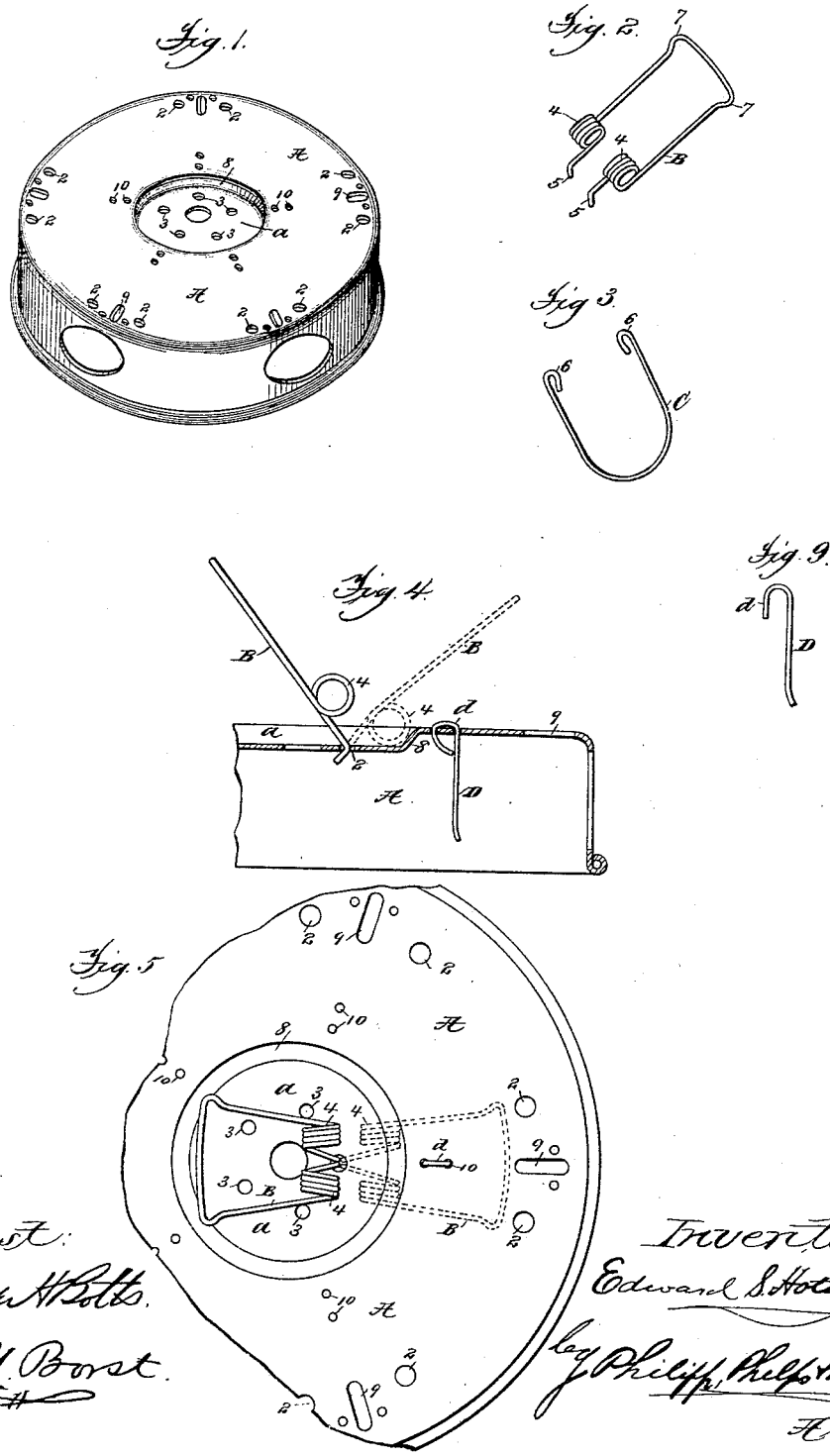

(No Model.) 2 Sheets—Sheet 2.
E. S. HOTCHKISS.
METHOD OF INSERTING SPRINGS IN TRAPS.
No. 449,534. Patented Mar. 31, 1891.
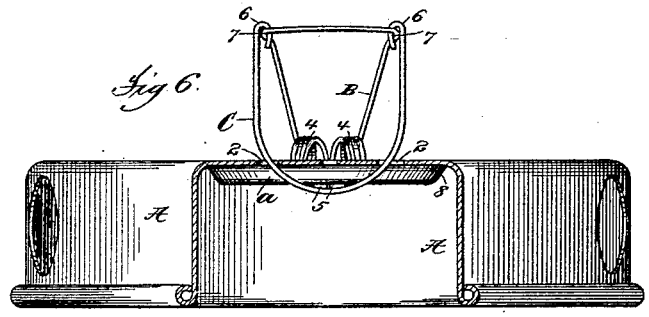
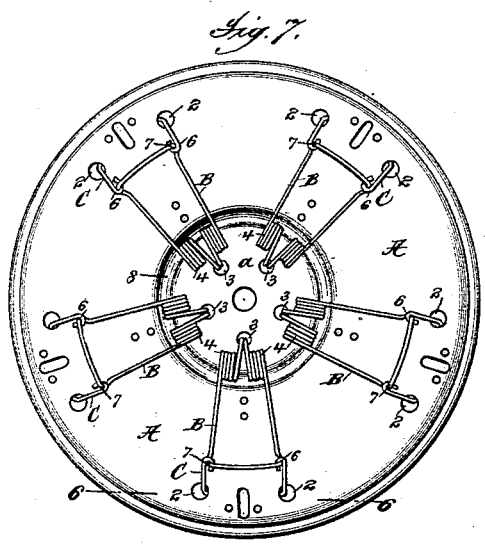
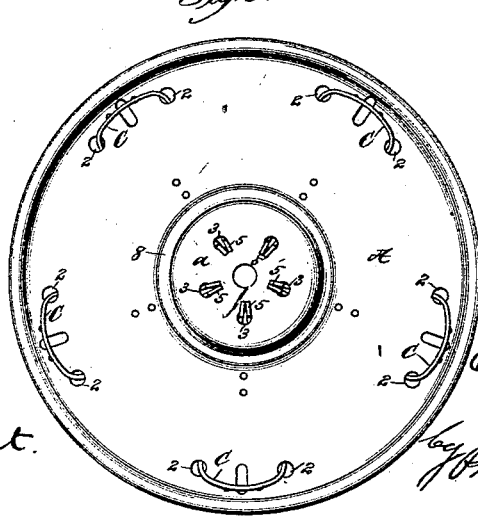

UNITED STATES PATENT OFFICE.

EDWARD S. HOTCHKISS, OF BRIDGEPORT, CONNECTICUT.

METHOD OF INSERTING SPRINGS IN TRAPS.

SPECIFICATION forming part of Letters Patent No. 449,534, dated March 31, 1891.

Application filed February 27, 1888. Serial No. 265,462. (No model.)

*To all whom it may concern:*

Be it known that I, EDWARD S. HOTCHKISS, a citizen of the United States, residing at Bridgeport, county of Fairfield, and State of Connecticut, have invented certain new and useful Improvements in Methods of Inserting the Springs in Traps, fully described and represented in the following specification and the accompanying drawings, forming a part of the same.

This invention relates to the manufacture of a trap designed for the destruction of mice and similar animals, which is constructed upon the general plan described in my prior Letters Patent No. 355,016; and the invention consists in a novel method of inserting the springs of the trap, whereby an economy of labor is effected and the expense attending the manufacture of the trap correspondingly reduced.

In order to convey an adequate understanding of the improvements constituting the present invention it is proper to explain that these traps, in order to be salable, must be supplied to the trade at so small a price that a saving of a small fraction of one cent in the manufacture of each trap will amount to a fair per cent. of profit to the manufacturer.

I will now describe in detail my improved trap and method, reference being had to the accompanying drawings, which illustrate the principal parts of the trap and the several steps or operations involved in assembling the same according to my method, and in which—

Figure 1 is a perspective view of the body of the trap before any of the minor parts are assembled thereon. Fig. 2 is a perspective view of one of the springs of the trap. Fig. 3 is a similar view of the yoke or choke-piece. Figs. 4 and 5 are respectively a section and plan of a portion of the trap, illustrating the first and second steps in the operation of assembling the parts according to my method. Fig. 6 is a section illustrating the third step. Fig. 7 is a top, and Fig. 8 a bottom, plan of the trap with all of the springs and yokes assembled. Fig. 9 is a view of one of the bait-hooks before being assembled with the other parts.

Referring to said figures, it is to be understood that the body A of the trap is made of sheet metal and is struck up to the proper form out of a single blank, as shown and described in my prior Letters Patent referred to.

The body A is provided around the edges of its top with a number of pairs of openings 2 for the passage of the arms of the several yokes, and also with openings 9 for the triggers, and openings 10 for the bait-hooks, the triggers in this case being of the class which are disconnected from the bait-hooks, and which are operated by a ring, through which the head of the mouse passes, and which engages with its shoulders, as distinguished from that class which are operated by the nibbling of the bait. At the center of the body there is formed a depression *a*, which provides a seat for the coils 4 of the springs, and this depressed portion is provided with openings 3, through which the ends 5 of the springs are passed to give them the necessary fulcrum, the openings 3 being made of sufficient size to permit the ends 5 to be inserted after they are bent to form the clinches. The springs B and yokes or choke-pieces C are of the same general form that is common in this class of traps, except that the ends 5 of the springs which form the clinches for holding the springs in the body, instead of projecting straight from the coils 4, as has heretofore been common, are in the process of forming the springs, and for a purpose that will presently appear, bent at a short distance from the coils, so as to project away from the coils at right angles or about right angles to the main part or body of the spring.

The manner of assembling the parts will now be described in detail, reference being made to the former method to better distinguish the new from the old. The body A having been struck up to the form shown in Fig. 1, the yokes C of the form shown in Fig. 3 were, according to the old method, inserted through the openings 2 from beneath, and their ends 6 were bent or clinched around the portions 7 of the springs. The ends 5 of the springs, which in that case were, as before explained, straight, were passed through the openings 3 and bent or clinched upon the under side of the top of the trap by being spread apart, so as hold the springs and yokes in position. In this method of assembling the parts a special operation was required to clinch the ends 5 of the springs, and as this clinching had to be performed within the body of the trap and in a cramped position it required the use of special tools and the exercise of considerable skill on the part of the operator and required more time than any other single operation in assembling the parts. Moreover, the openings 3 were of small size, so that the ends 5 of the springs would fit closely therein, this being necessary for the operation of clinching, and a loss of time resulted from the difficulty of inserting the springs through the small openings. By the present method the spring having its ends 5 bent to form the clinches, as shown in Fig. 2, (which can readily be done at the same time the springs are formed without consuming any appreciable amount of time,) is pressed together until the ends 5 are side by side, and the ends 5 are then inserted through one of the openings 3, as shown in Figs. 4 and 5, the openings 3 preferably being made of sufficient size to permit this to be done readily. To do this the spring may be held in any convenient position which will allow the clinches 5 to pass through the opening 3. The spring is then turned to the position shown by dotted lines in Figs. 4 and 5, which brings the coils 4 against the shoulder 8 of the depression $a$ and the clinches 5 up against the under side of the body A, as shown. The yoke C is then passed through the openings 2, and its ends 6 are hooked over and fastened to the springs, as shown in Fig. 6, and this operation is repeated until all the springs and yokes are assembled, as shown in Fig. 7. By this method it will be observed the special operation of clinching the ends of the springs is entirely avoided, and this saving, although very trifling when considered in connection with a single trap, is a matter of considerable importance in the aggregate in view of the large numbers in which these traps are made, and is sufficient in view of the very small price at which they are sold to the trade to form the basis of quite an appreciable per cent. of profit to the manufacturer. It will also be observed that as a result of this method of assembling the parts the ends 5 of the springs all project directly inward toward the center of the trap, as shown in Fig. 8, thus being in the position which gives them the very best leverage to hold the springs securely in position and prevent them from being withdrawn from the openings 3.

The triggers and bait-hooks may be assembled on the body either before or after the assembling of the springs and yokes. The triggers and bait-hooks may be assembled in any desired manner; but I prefer to assemble the bait-hooks in the manner shown in the drawings. According to the method heretofore employed, the top of the trap was provided with a depending staple for each bait-hook, and the hooks D, of substantially the form shown in Fig. 9, were suspended from these staples by having the hooks $d$ at their upper ends closed around the staples. This was a slow and expensive method, because the forming and insertion of the staples necessarily required considerable time and labor. By the present method the bait-hooks of the form shown in Fig. 9 are simply inserted through the openings 10, the longer arm of the hook passing through one opening and the shorter arm through the other. The hook $d$ is then closed, as shown in Fig. 4, so as to hold the bait-hook in position. By this method the assembling involves but a single operation, and is of course a great saving of time. The openings 10 are formed at the same time the other openings are formed in the body and without loss of time or labor.

While I have shown and described my invention as applied to a metal trap of the construction of my prior patent, above referred to, and this is the preferred construction of my trap, it will be understood that the depression $a$ is not absolutely essential; but that my invention may be applied to a trap of the common flat top or other suitable construction. It will be understood, also, that my invention is independent of the material of which the body of the trap is composed, and is applicable to wooden as well as metal traps.

What I claim is—

1. The herein-described method of inserting the springs in that class of traps in which the springs are held under tension by yokes secured thereto, which consists in bending the ends of the springs 3 away from the coils to form the clinches 5, then inserting said clinches 5 through the openings 3 in the trap-body, then turning the springs so as to press the coils down against the body and the clinches 5 against the under side of the body, the springs being held in the trap by the tension produced by the yokes, substantially as described.

2. The herein-described method of inserting the springs in traps, which consists in bending the ends 5 of the springs 3 away from the coils to form the clinches, then inserting said clinches 5 through the openings 3 in the trap-body, then turning the springs so as to press the coils down against the body and the clinches 5 against the under side of the body, and securing the ends of the yoke to the spring, substantially as described.

In testimony whereof I have hereunto set my hand in the presence of two subscribing witnesses.

EDWARD S. HOTCHKISS.

Witnesses:
 ALFRED B. BEERS,
 NORTON L. EDWARDS.

Corrections in Letters Patent No. 449,534.

It is hereby certified that in Letters Patent No. 449,534, granted March 31, 1891, upon the application of Edward S. Hotchkiss, of Bridgeport, Connecticut, for an improvement in "Method of Inserting Springs in Traps," errors appear requiring correction, as follows: On page 2, in lines 100 and 111, the word and numeral "springs 3" should read *springs B;* and that the said Letters Patent should be read with these corrections therein that the same may conform to the record of the case in the Patent Office.

Signed, countersigned, and sealed this 14th day of April, A. D. 1891.

[SEAL.]

CYRUS BUSSEY,
*Assistant Secretary of the Interior.*

Countersigned:
C. E. MITCHELL,
*Commissioner of Patents.*